United States Patent
Kernene

(10) Patent No.: US 8,852,821 B2
(45) Date of Patent: Oct. 7, 2014

(54) ENERGY UNIT WITH SAFE AND STABLE HYDROGEN STORAGE

(75) Inventor: Nicolas Kernene, St. Charles, IL (US)

(73) Assignee: Twisted Sun Innovations, Inc., St. Charles, IL (US)

( * ) Notice: Subject to any disclaimer, the term of this patent is extended or adjusted under 35 U.S.C. 154(b) by 7 days.

(21) Appl. No.: 13/407,179

(22) Filed: Feb. 28, 2012

(65) Prior Publication Data
US 2012/0225362 A1 Sep. 6, 2012

Related U.S. Application Data

(60) Provisional application No. 61/447,571, filed on Feb. 28, 2011.

(51) Int. Cl.
| | |
|---|---|
| H01M 6/36 | (2006.01) |
| H01M 8/06 | (2006.01) |
| F17C 11/00 | (2006.01) |
| H01M 8/04 | (2006.01) |

(52) U.S. Cl.
CPC ........ *H01M 8/04216* (2013.01); *H01M 8/0656* (2013.01); *Y02E 60/50* (2013.01); *F17C 11/005* (2013.01); *Y02E 60/321* (2013.01)
USPC .......................................... 429/411; 429/422

(58) Field of Classification Search
USPC ........................... 204/242–275.1; 180/65.21; 429/512–516, 507–511, 418, 462, 411, 429/422; 48/61; 206/0.6; 220/4.14, 4.15, 220/905, 567.2, 581, 901
See application file for complete search history.

(56) References Cited

U.S. PATENT DOCUMENTS

| | | | |
|---|---|---|---|
| 5,551,991 A | 9/1996 | Avero | |
| 2002/0100836 A1 | 8/2002 | Hunt | |
| 2005/0252548 A1* | 11/2005 | Stetson et al. | ................... 137/72 |
| 2008/0233440 A1* | 9/2008 | Kernene | ........................ 429/17 |
| 2008/0277273 A1* | 11/2008 | Logan | .......................... 204/253 |

OTHER PUBLICATIONS

Pyle et al., "Solar Hydrogen Production by Electrolysis", Home Power #39, 1994, http://www.dangerouslaboratories.org/h2homesystem.pdf pp. 32-34.*
Search Report issued by the International Searching Authority on Jul. 8, 2012 in connection with corresponding PCT application No. PCT/US2012/026950.
Pyle et al., "Solar Hydrogen Production by Electrolysis", Home Power #39, 1994, http://www.dangerouslaboratories.org/h2homesystem.pdf especially pp. 32-34.

* cited by examiner

*Primary Examiner* — Patrick Ryan
*Assistant Examiner* — Kiran Quraishi
(74) *Attorney, Agent, or Firm* — Ostrolenk Faber LLP

(57) ABSTRACT

An energy unit in accordance with an embodiment of the present application stores at least water and hydrogen. The energy unit includes an electrolysis component operable to provide hydrogen from the water, a hydrogen storage component operable to safely and stably store hydrogen in solid form and a fuel cell component operable to produce electricity from the hydrogen. The energy unit may be grouped with other like energy units to provide constant power for desired applications.

21 Claims, 7 Drawing Sheets

ENERGY UNIT WITH SAFE AND STABLE HYDROGEN STORAGE

CROSS-REFERENCE TO RELATED APPLICATION

The present application claims benefit of and priority to U.S. Provisional Patent Application Ser. No. 61/447,571 filed Feb. 28, 2011 entitled ENERGY UNIT WITH SAFE AND STABLE HYDROGEN STORAGE, the entire content of which is hereby incorporated by reference herein.

BACKGROUND

1. Field of the Disclosure

The present disclosure relates generally to energy, and, more particularly, to a power source capable of providing electricity in remote locations. In particular, the present application relates to an energy unit that provides safe and stable storage of hydrogen for use in making electricity.

2. Description of the Related Art

Producing electricity from hydrogen is known. In known applications, an electrolyzer is used for producing a source of hydrogen from water. As known in the art, hydrogen and oxygen are produced by electrolysis of water. A water electrolysis reaction occurs when sufficient energy is applied to break the water's oxygen-hydrogen-bond.

As known in the art, electrolysis includes an electrochemical process involving the decomposition of an electrolyte. During electrolysis, an electrolyte decomposes, for example, when an external DC voltage is applied to two electrodes, i.e., an anode and a cathode, which are in contact with the electrolyte. The voltage equals or exceeds a threshold value, which, depending upon the particular electrolyte, causes the electrolyte to decompose and the hydrogen-water bond to break. The minimum voltage necessary to decompose the electrolyte is referred to as the "decomposition voltage." Water may also be electrolyzed using other processes, such as a photosynthetic process, for example.

Furthermore and as known in the art, some proton exchange-membrane ("PEM") electrolyzers enable the production of hydrogen and oxygen through the electrolysis of water. PEM electrolyzers include electrolyte material, which includes a proton-conducting polymer membrane. When the membrane becomes wet, sulfonic acid attached thereto detaches, and the membrane becomes acidic and proton-conducting. Protons, i.e., positively charged hydrogen ions, pass through the membrane, while anions, i.e., negatively charged ions, do not pass through the membrane.

Thus and as known in the art, PEM electrolyzers separate pure water into hydrogen and oxygen when a DC voltage is applied to electrodes (i.e., cathode and anode) provided with the PEM electrolyzers. When the DC voltage exceeds the decomposition voltage, the electrolyzer splits pure water into hydrogen and oxygen. Other techniques for separating water into hydrogen and oxygen are known. Also and as known in the art, fuel cell technology allows the use of hydrogen as fuel to produce electricity. For example, hydrogen collected as a function of PEM electrolyzers is used in fuel cells. Moreover, several individual fuel cells are combinable in a unit, referred to in the art as a "fuel cell stack." A fuel cell stack is desirable to achieve an appreciable output voltage and/or current. Thus, in order to achieve appreciable output voltages, several individual fuel cells must be combined in a unit called a fuel cell stack.

Adjacent fuel cells can be connected by a separator, which may be formed as a plate. The plate is operable to provide electrical connections between the respective fuel cells. Also, the plates can provide a gas transport towards and away from the respective fuel cells. Further heat that is produced by the respective fuel cells can be dissipated by the separator plate. Moreover, adjacent cells can be sealed by the separator plate, thereby preventing fuel and oxidant leakage.

In some known embodiments, plates are attached to the ends of a fuel cell stack. The plates are operable to electrically connect one or more external circuits and can also provide connections for gas flow. Due to production of heat, one or more fuel stack may be further provided with cooling, including by air or water.

In known hydrogen-based fuel cells, electrical production occurs as a function of hydrogen atoms contacting the plate, effectively taking electrons from the hydrogen atoms and producing free electrons. Hydrogen generally exists in nature as di-hydrogen ($H^2$) molecules. Every two di-hydrogen molecules ($2H^2$) include 4 hydrogen protons and 4 free electrons of potential energy ($4H^+ + 4e^-$). Further and as known, oxygen atoms are attracted to the positively charged hydrogen protons ($4H^+$) due to the lone pair of electrons on the outer shell of oxygen. Oxygen exists in nature as di-oxygen ($O^2$) molecules. The oxygen atoms bond with the hydrogen protons, thereby producing atoms of water and leaving the free electrons, thereby generating electricity ($4H^+ + 4e^- + O^2 \rightarrow 4H^+ + O^2 + 4e^- \rightarrow 2H^2O + 4e-$). Other techniques for providing electricity using hydrogen are known as well.

Also in known embodiments, a respective number of individual fuel cells determines a particular output voltage. The cells are electrically connected in series, such that the addition or subtraction of a fuel increases or decreases the output voltage, respectively. As known, the total output voltage is determined by the sum of the each fuel cell's output voltage.

Further, it is known to store hydrogen as a metal hydride, for example, in the crystal lattice of certain metals or metal alloys. As known in the art, an exothermic (heat producing) reaction occurs when hydrogen bonds to the metal (or alloy) to form a metal hydride, and the hydrogen is stored. By applying heat to a metal hydride, the hydrogen is releasable and, thereafter, usable in a fuel cell. Alternatively, hydrogen may be released from the metal hydride using negative air pressure or application of a low electrical current.

Storing hydrogen as a metal hydride would be preferred way to store hydrogen, as it is believed to be safer and easier to handle. Further, a small volume of metal hydride is operable to store a considerable amount of hydrogen and sufficient to provide a considerable amount of fuel to produce electricity. However, a known shortcoming of storing metal hydride for the production of electricity is that the energy storage density per mass is low and, therefore, the storage tanks are considerably heavy. Further, storing hydrogen in metal hydrides generally also requires high pressure to force the hydrogen atoms into the crystalline structure of the metal. A relative lower pressure is necessary to maintain the hydrogen in the metal hydride, typically 450-800 psi, however, even this relatively low storage pressure is too high to be considered safe. Thus high-pressure operation raises the same safety issues discussed above with respect to high-pressure storage of hydrogen gas.

Accordingly, it would be desirable to provide an energy unit that avoids the above problems related to high pressure operation, safety, efficiency and other problems.

SUMMARY

In a preferred embodiment, an energy unit is disclosed that stores water and hydrogen. The energy unit includes an electrical source, which may be incorporated into the material of the unit itself, if desired, that provides electricity for operating in a first mode to produce hydrogen from the water. This hydrogen is safely and stably stored in a solid form in the energy unit in a second mode. In a third mode, the hydrogen is used to make electricity.

An energy unit in accordance with an embodiment of the present disclosure includes a housing, a power source mounted in or on the housing and configured to provide electricity, a fluid chamber in the housing configured to hold a volume of fluid, an electrolysis element in the housing electrically connected to the power source and in fluid communication with the fluid chamber, the electrolysis chamber configured and operable to break the fluid down and to provide hydrogen gas, a hydrogen storage element in the housing connected to the electrolysis element and configured to store hydrogen in solid form and a fuel cell in the housing, connected to the hydrogen storage element and operable to generate electricity using at least hydrogen supplied from the hydrogen storage element.

An energy system in accordance with an embodiment of the present disclosure includes a plurality of energy units, each energy unit including a housing, a power source mounted in or on the housing and configured to provide electricity, a fluid chamber in the housing configured to hold a volume of fluid, an electrolysis element in the housing electrically connected to the power source and in fluid communication with the fluid chamber, the electrolysis chamber configured and operable to break the fluid down and to provide hydrogen gas, a hydrogen storage element in the housing connected to the electrolysis element and configured to store hydrogen in solid form; and a fuel cell in the housing, connected to the hydrogen storage element and operable to generate electricity using at least hydrogen supplied from the hydrogen storage element. Each energy unit is connected with at least one other energy unit such that multiple energy units operate together to provide electricity at a desired voltage or current.

Other features and advantages will become apparent from the following description that refers to the accompanying drawings.

BRIEF DESCRIPTION OF THE DRAWINGS

For the purpose of illustration, there is shown in the drawings a form, which is presently preferred, it being understood, however, that the invention is not limited to the precise arrangements and instrumentalities shown. The features and advantages of the teachings herein will become apparent from the following description that refers to the accompanying drawings, in which.

DETAILED DESCRIPTION OF THE EMBODIMENTS

Figure 1:
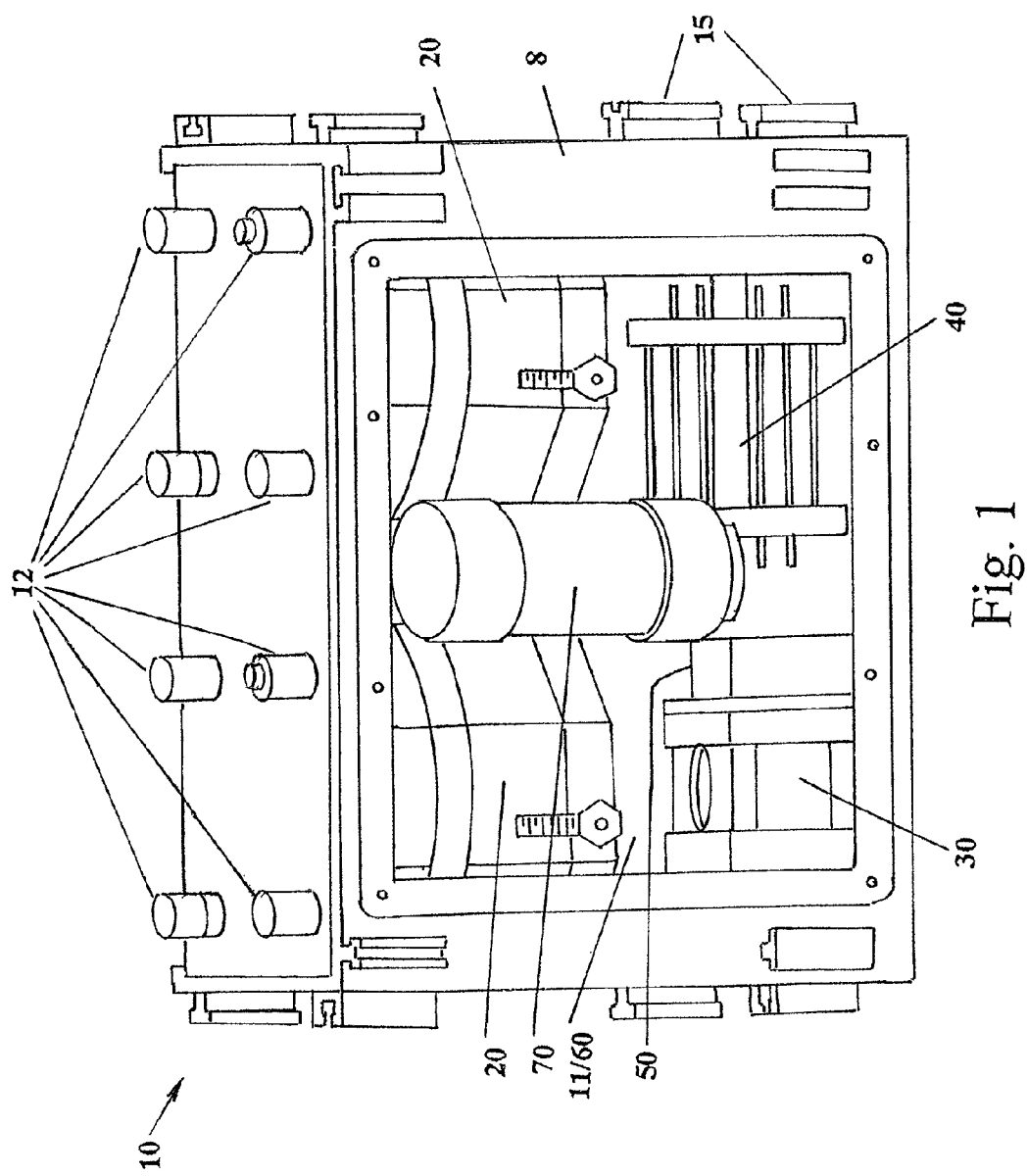
FIG. 1 is a perspective front and top view of an energy unit in accordance with an embodiment of the present application.
Figure 2:
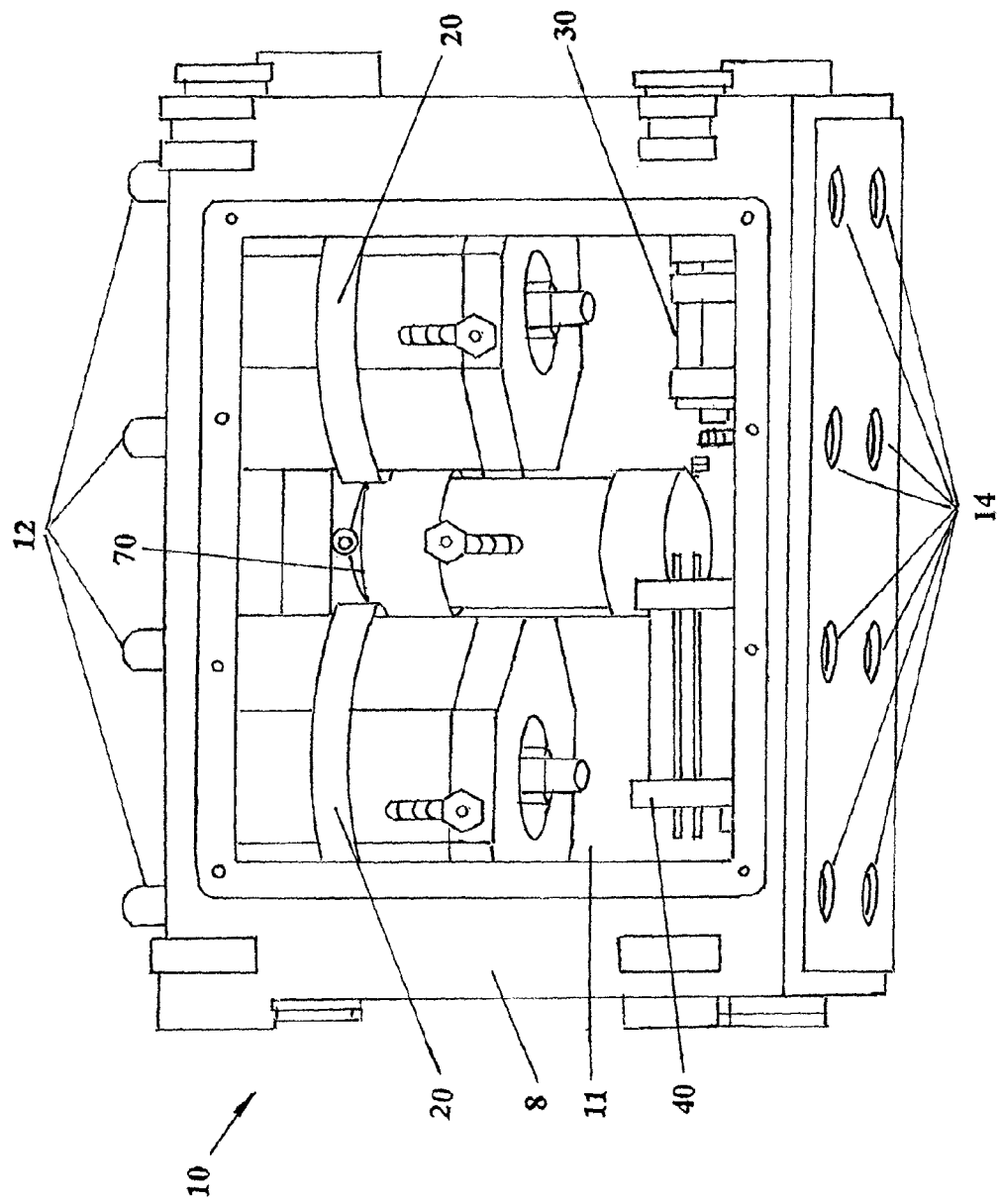
FIG. 2 is a perspective rear and bottom view of the energy cell in FIG. 1.
Figure 3:
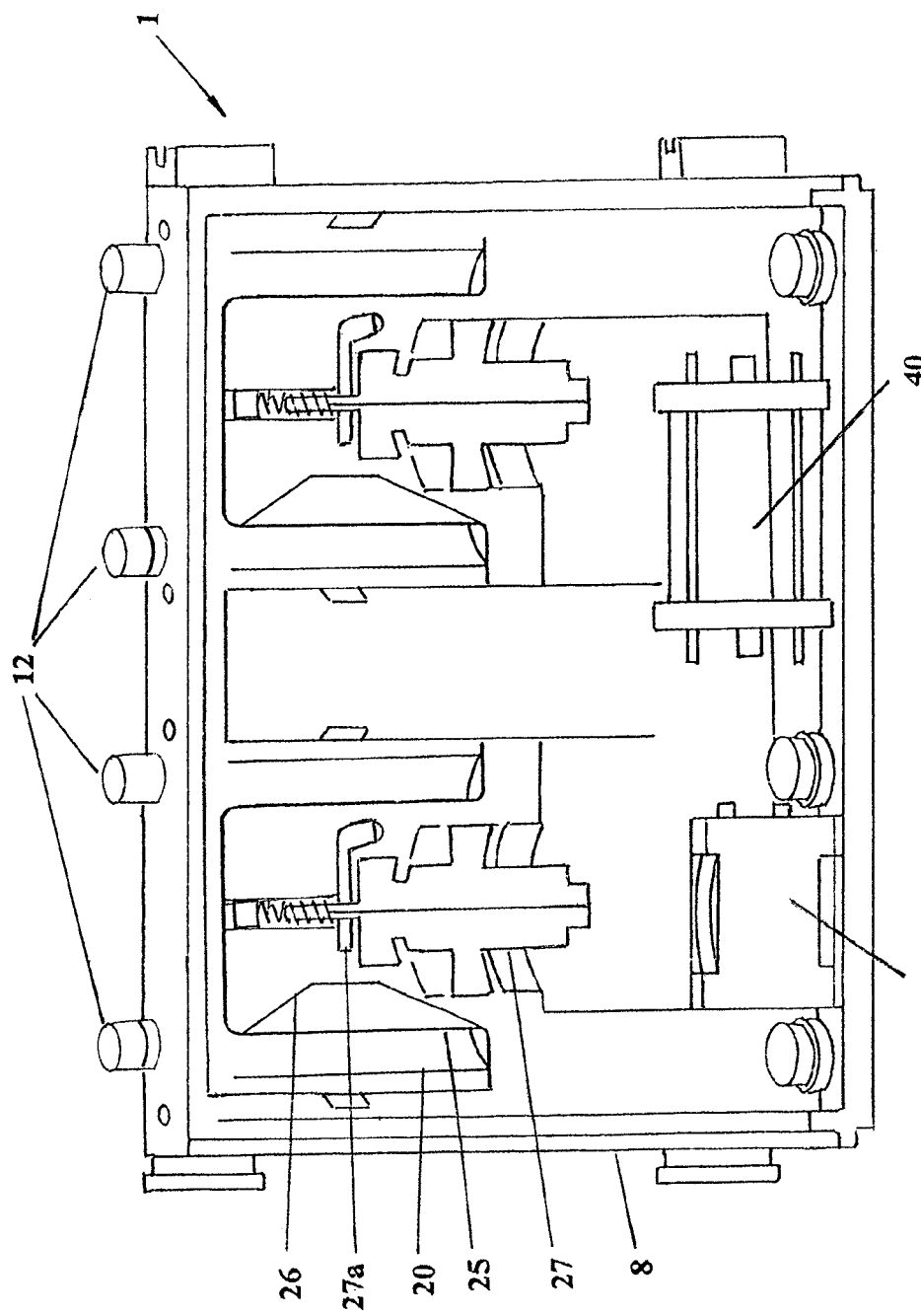
FIG. 3 is cross sectional view of the energy cell as illustrated in FIG. 2.

In accordance with the various embodiments described and illustrated herein, a portable and extremely durable energy source is provided that functions independently to produce, for example, electricity. Referring to the drawings, in which like reference numerals refer to like elements, there is shown in FIG. 1 a front and top view of the energy source in the form of energy unit 10. FIG. 2 illustrates a rear and bottom view of the energy unit while FIG. 3 illustrates a cross sectional view thereof. In the examples illustrated and described herein, hydrogen is the preferred fuel used by the energy unit 10 to provide electricity. It is envisioned herein, however, that alternative chemicals and/or elements may be used as fuel for electricity without departing from the spirit of the teachings herein. Thus, the energy unit 10 of the present application is not limited to use with water. While hydrogen will be used for transport of electrons, however, the method of electrolysis may vary. For example, the electron source, which is water as described above, may alternatively be a bio fuel.

In a preferred embodiment, the energy unit 10 is provided in a rectangular brick-shape, as illustrated in FIG. 1, for example. An outer frame 8 is provided in which a hydrogen storage component 20, electrolysis component 30 and fuel cell component 40 are provided. As illustrated, the side panels 11, fastened to the frame 8 are preferably made of a clear, transparent, or translucent material, such as LUCITE, for example. The rectangular shape is preferred, however alternative shapes may be used, including but not limited to triangles, spheres, cones, cylinders and pyramids. The energy unit 10 is preferably configured and structured such that multiple units may be stacked, or otherwise combined together, physically and/or functionally. Indeed, a plurality of the energy units 10 may be stacked together and included in a structure such as a wall or building.

Moreover, the individual units 10 may be stacked and interconnected to create a larger and more powerful energy source. The units may be connected in parallel, for example to provide a larger voltage, or in series, to generally provide for increased amperage. Interconnection may be provided by simply mating two of the units 10 together. In one embodiment, studs 12 are provided on one end of the unit 10 and receptacle portions 14 (See FIG. 1-2) to receive studs 12 from another unit are provided at another end of units 10. The fuel cell component 40 preferably includes a plurality of fuel cells in the form of a fuel stack such as that discussed above.

The energy unit 10 also includes a water chamber 50 configured and operable to hold a volume of water or other fluid. In a preferred embodiment, the unit 10 holds approximately 1.1 liters of water, in total. It is noted, however, that the energy unit 10 may be scaled upward or downward based on use and more or less water may be accommodated as desired.

This volume of water is used by the electrolysis component 30 to provide a supply of hydrogen. The electrolysis component 30 includes or is connected to a voltage source 60 that provides sufficient current to the electrolysis component 30 to separate water into hydrogen and oxygen gas.

In a preferred embodiment, the voltage source 60 is a solar powered voltage source. Thus, sunlight is converted to electricity, for example, using a photovoltaic cell (not shown). In a preferred embodiment, the voltage source 60 includes mono-crystalline silica solar cells that are provided on the sides of unit 10. In an embodiment, solar cells may be impregnated in the panels 11, for example, as shown in FIG. 1. Solar power technology that uses solar cells or solar photovoltaic arrays is preferably provided to convert energy from the sun into electricity. The electricity produced from the sunlight is used by a PEM (or other) electrolyzer within the electrolysis component 30 to separate hydrogen from pure water or from other sources. While it is preferred that the water be pure, it is not necessary as long as the water does not include dissolved solids. Therefore, hydrogen gas is produced from pure water as a function of electrolysis. The hydrogen is later converted into electricity, for example, using one or more fuel cells in the fuel cell component 40, in which the hydrogen is recombined with oxygen to produce electricity. If desired, the separated oxygen from the water may also be collected and used by the fuel cell component 40, for example to make electricity, or for any other desired use. For example, in a preferred embodiment, the separated oxygen may be used to purify water. The oxygen may be used to kill bacteria, for example, to purify water for drinking. The oxygen may also be used for medical purposes, for example, supplemental oxygen for breathing. The oxygen may also be used to sterilize other items such as cooking or medical instruments, for example. The oxygen may also be used to aid in air purification. While the electricity provided by solar power using voltage source 60 is preferably used for electrolysis, it may be used simply to provide electrical power for other devices, as well.

Thus, in a first mode, the energy unit 10 operates to collect hydrogen for eventual conversion to electricity using the electrolysis component 30. In a preferred embodiment, unit 10 does not operate to collect hydrogen and provide electricity simultaneously. That is, the unit 10 only operates in one mode at a time.

Figure 7:
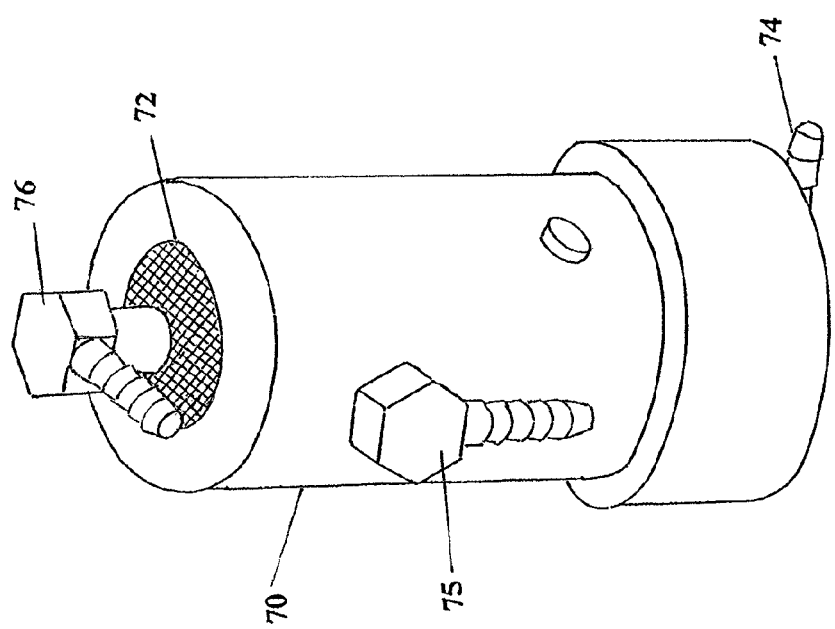
FIG. 7 illustrates a more detailed view of a drying device of the energy cell in accordance with an embodiment of the present application.

After the hydrogen gas is generated, it is preferably stored in a second mode. Hydrogen storage can be a difficult feat given the inherent dangers of storing any large amount of a flammable gas at pressure. One of the advantages provided by the energy unit 10 of the present application, however, is that hydrogen is stored in solid form safely and stably, as is explained in detail below. While the hydrogen is generally stored in order to provide electricity, the hydrogen may be used for other purposes as well. For example, the hydrogen may be used as fuel for cooking or heat, if desired. Further, the hydrogen may be used directly, prior to storage, if desire. In one embodiment, the hydrogen that is provided using the electrolysis component 30 is passed through drying device 70. FIG. 7 illustrates the device 70 with the top cap thereof hidden. The drying device 70 includes a column of water through which the separated hydrogen gas from the electrolysis device 30 passes. Water may be provided via nozzle 75, for example. The hydrogen may be provided through the nozzle 74, on the bottom of the device 70, for example. By bubbling the hydrogen gas through the column of water in the drying device 70, moisture is removed from the hydrogen. That is, any water vapor included in the hydrogen gas will tend to bond with the water molecules as the gas bubbles through the water in the drying device 70. In addition, a membrane 72 provided at a top of the device 70 and is made of a material that allows hydrogen to pass through, however, prevents water vapor from passing through. Thus, by the time the separated hydrogen gas passes through the drying device 70 it has a very low percentage of water vapor, and thus, can be considered "dry." In addition, a desiccant material may also be included to assist in drying the hydrogen. Such dry hydrogen is easier to store in solid form. Hydrogen preferably leaves the device 70 via nozzle 76.

In one embodiment, the drying device 70 may include an aerator through which the hydrogen gas passes prior to being stored. The aerator is made of, or includes a zinc catalyst that removes any oxygen gas that may be included in the hydrogen gas. The aerator may be included in the device 70, or outside the device 70 between the device and the hydrogen storage device 20. Pure hydrogen is easier to store in solid form than hydrogen that includes some oxygen mixed therein. The aerator serves to eliminate any remaining oxygen from the hydrogen.

Figure 4:
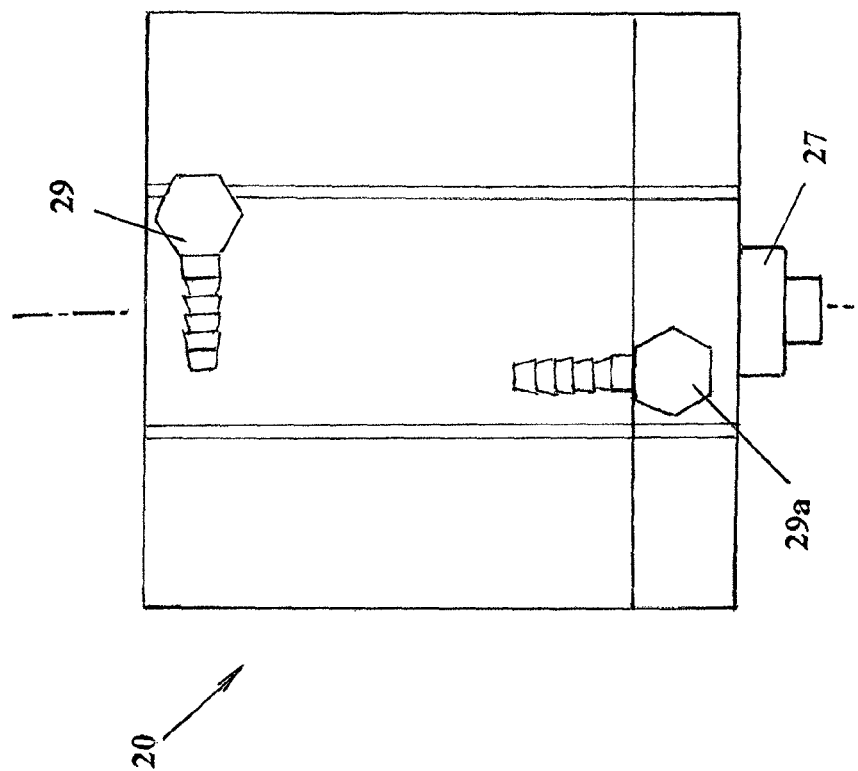
FIG. 4 is a more detailed view of a hydrogen storage component of the energy cell illustrated in FIGS. 1-3.

FIG. 4 illustrates a more detailed view of the hydrogen storage component 20 that is preferably provided in the energy unit 10. In fact, as can be seen in FIGS. 1-3, there are preferably two hydrogen storage components 20 provided in the unit 10. Additional or fewer hydrogen storage components 20, however, may be used.

Figure 5:
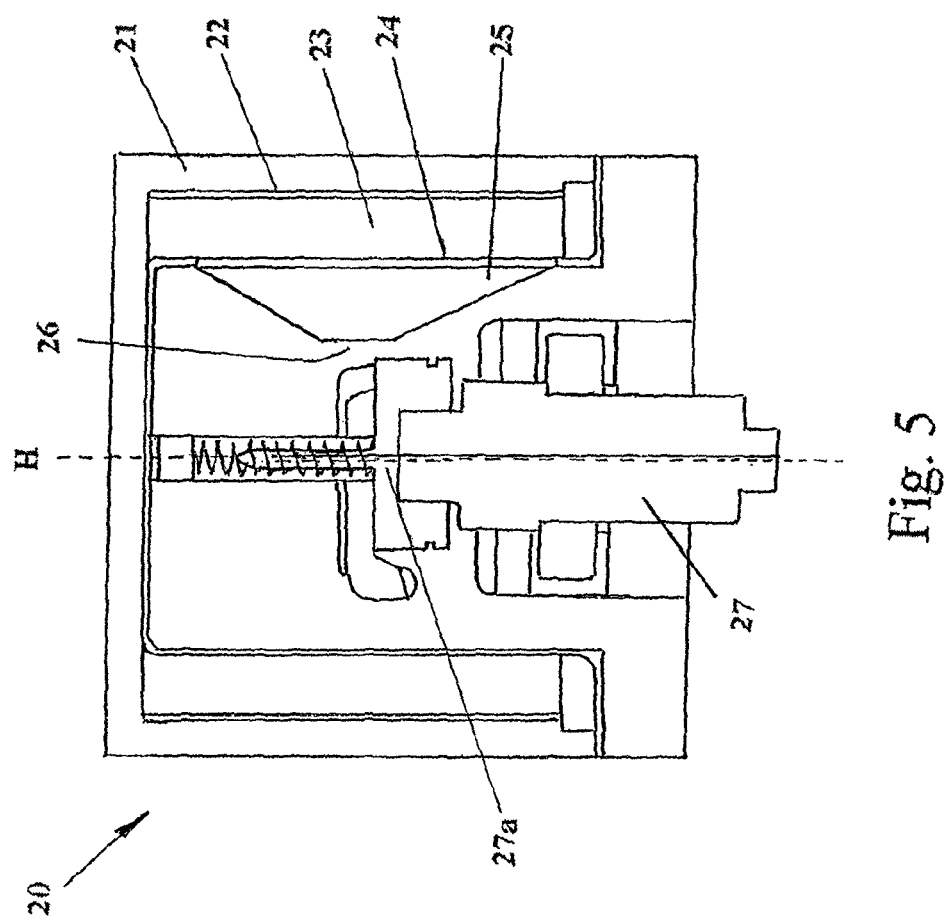
FIG. 5 is a cross sectional view of the hydrogen storage component illustrated in FIG. 4.

FIG. 5 illustrates a cross-sectional view of an exemplary embodiment of the hydrogen storage component 20. In a preferred embodiment, an outer cylindrical cover 21 is provided around an outer perimeter of the component 20. An outer liner 22 made of a somewhat stiff material is provided inside the outer cover 21. A metal hydride material 23 is provided inside the outer liner 22. The metal hydride material 23 is a solid material that absorbs the hydrogen gas to provide safe and stable storage. An inner liner 24 is provided on the inner surface of the metal hydride material 23. The material of the inner liner 24 is configured and structured to be flexible and to allow the hydrogen gas to pass freely into the metal hydride 23. A hydrogen gap 25 is provided between the inner liner 24 and a conically shaped ram head 26 mounted in a center of the component 20. The ram head has a central axis H substantially aligned with a central axis of the component 20. A solenoid 27 is connected to the ram head 26 via an actuator 27a, which is movable up and down at a desired frequency. The ram head 26 thus moves up and down at the same desired frequency. The gap 25 is filled with the hydrogen gas that was provided by the electrolysis component 30 and enters the component 20 via nozzle 29, for example. In a preferred embodiment, check valves may be provided at hydrogen entry and exit points to avoid backpressure and to prevent air from being drawn into the chamber. The small pressure variations provided by the solenoid aid in pushing the hydrogen into the hydrides during the compression stroke and will avoid a vacuum form drawing air into the chamber during the release stroke.

The movement of the solenoid 27 and the ram head 26 attached thereto provides two advantages. First, the frequency at which the solenoid 27 moves is set such that it is resonant with a frequency of the metal hydride material 23. This frequency will vary depending on the particular material and the relative amount provided. The resonance relationship, however, results in vibration in the crystalline lattice of the metal hydride 23. The resonant vibration increases the opportunity or the number of chances the hydrogen has to attach to the lattice. As a result, it is easier for hydrogen to fit into the lattice without the need to apply high pressure. The movement to the ram head 26 also physically pushes hydrogen in the gap 25 toward the metal hydride material 23. That is, the percussive force of the moving ram head 26 repeatedly drives the hydrogen into the loosened crystalline structure of the metal hydride 23. The result is hydrogen absorption into the metal hydride 23 at low pressure. As noted above, the inner liner 24 is made of a material that allows the hydrogen to easily pass through it and into the metal hydride material 23. This material is also flexible to accommodate the increased volume of the material 23 after it absorbs hydrogen.

In this manner, a large volume of hydrogen can be safely stored in solid form in the metal hydride material 23. In addition, as is mentioned above, it is generally easier to store "dry" hydrogen in solid form. Thus, the dry hydrogen provided in the energy unit 10 is generally easier to store in solid form. No other hydrogen based power source provides these unique features to allow for safe and stable storage of hydrogen in solid form or for solid state storage at low pressures.

While the present application describes the use of a solenoid 27 to provide the movement of the ram head 26, other alternatives may be used. For example, a piezoelectric material may be used in place of the solenoid 27. Such materials provide very high frequency vibration when a voltage is applied, typically in the range of 50-20,000 Hz. The amplitude of the movement, however, is very small. The exact amplitude will vary based on the size of the diaphragm used. In contrast, the solenoid 27 provides for operation at a frequency from about 60 Hz-2500 Hz with a displacement of the ram head 26 less than that of the solenoid. Alternatively, a relatively high frequency vibration may be provided by a small motor, such as those used to make items such as cell phones vibrate. These devices typically vibrate at a higher frequency than a solenoid, typically around 60-10,000 Hz, however, much lower than a piezoelectric material. The amplitude of the vibration is also larger than the piezoelectric material, but smaller than a solenoid. While the solenoid is preferred, any vibrating element may be used in the hydrogen storage component 20.

In another embodiment, the solenoid 27 and ram head 26 may be mounted in a flexible cup-shaped cap assembly (not shown) mounted in the hydrogen gap 25. The cap assembly preferably includes a lower portion generally with a bottom and sidewalls extending upward therefrom toward a top portion with a flange extending outward perpendicularly. The lower portion of the cap assembly is cylindrical in shape. The cap assembly provides for a physical separation between the hydrogen in the gap 25 and the ram head 26 and solenoid 27. This provides additional safety as the flammable hydrogen is separated further from the electrically operated solenoid 27. In addition, the cap assembly reduces the size of the hydrogen gap 25 such that the component 20 will operate to store hydrogen in the metal hydride with a lower volume of hydrogen in the gap. As the ram head 26 vibrates, the volumetric pressure in the lower portion of the cap assembly changes, which results in the sidewalls of the cap assembly vibrating. This vibration provides for both the resonance interaction with the material 23 and the percussive force driving the hydrogen in the gap 25 surrounding the sidewalls into the metal hydride material, which also surrounds the lower portion of the cap assembly. In one embodiment, the lower portion of the cap assembly is filled with a substantially incompressible fluid, such as water, for example. This embodiment provides good control of the change in volumetric pressure provided by the vibration of the solenoid 27. Using water on the opposite side of the hydrogen storage allows for greater pressure since hydraulic pressure is generally more efficient. Since air is a compressible fluid, some of the displacement is merely absorbed by the air. In contrast, in a hydraulic system, since water is an incompressible fluid displacement is more efficient.

In a third mode, hydrogen is released from storage in the metal hydride 23 and provided to the fuel cell component 40 to provide electricity. As noted above, the metal hydride material 23 is stored between an outer liner 22 and an inner liner 24. The inner lined is made of a material that is relatively permeable to hydrogen gas and flexible to accommodate the expanding volume of the material 23 as it absorbs hydrogen. The outer liner 22 is preferably fairly stiff. The material of the inner liner 24, however, is also relatively elastic, such that it tends to return to its original shape after the pressure of the hydrogen gas in the gap 25 falls below a certain point, and thus, hydrogen stops entering the material 23. The pressure in the chamber during storage rises to about 80 psi. When the outlet of the chamber is opened, for example via nozzle 29a, this pressure drops and hydrogen is released from the hydride 23. The pressure exerted by the flexible material of the liner 24 also aids in hydrogen release as well. The released hydrogen is then provided to the fuel cell component 40, via nozzle 29a, for example, of component 20.

Figure 6:
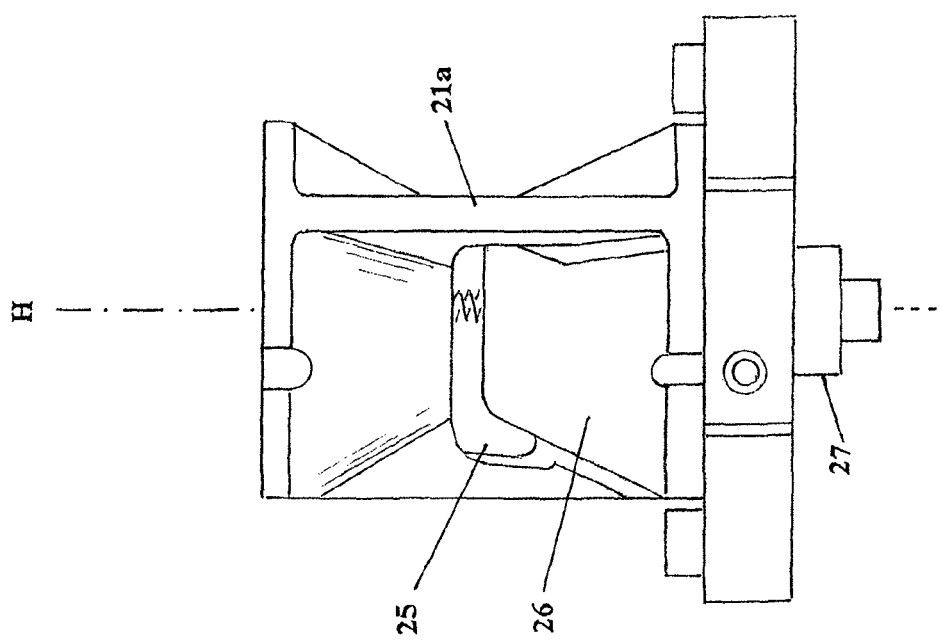
FIG. 6 is a more detailed view of the conical ram head structure included in the hydrogen storage component of FIGS. 4-5.

FIG. 6 illustrates a more detailed view of the ram head 26. As illustrated, the ram head 26 has a conical structure, which maximizes its surface area contact with hydrogen in the gap 25. The conical shape is further useful to sculpt the pressure wave, directing it to the top and bottom of the storage container. In addition, vertical ribs 21a are provided to divide the gap 25 into compartments to further maximize the percussive force of the ram head 26. The metal hydride material 23 may similarly be divided into component pieces for positioning in the compartments.

The hydrogen released from the metal hydride material 23 is provided to the fuel cell component 40, which uses it to produce electricity using any of a plurality of known techniques. The hydrogen may be used for other purposes as well, for example, the hydrogen may be burned directly to provide heat or for cooking. In a preferred embodiment, the fuel cell component 40 includes several individual fuel cells combined in a unit. As is noted above, this grouping of fuel cells is generally referred to as a "fuel cell stack" as is noted above. The use of the fuel stack is desirable to achieve an appreciable output voltage and/or current. Each fuel cell preferably includes a metal plate that may be constructed of a hard metal, such as platinum, that may operate as the proton exchange-membrane during electrolysis as well. That is, in one embodiment, elements of the electrolysis component 30 and the fuel cell component 40 may be combined or shared. That is, in an embodiment the electrolysis component 30 and the fuel cell component 40 may be combined into a single component. Such a component may be referred to as a reversible fuel cell. The combined component combines hydrogen and oxygen to provide electricity (and water), and is also operable to separate water into hydrogen and oxygen when electricity is provided from the power source 60, for example.

During the production of electricity using the fuel cell component 40, pure water is a natural byproduct, and the water remains in the energy unit 10 for future use during electrolysis. Thus, in accordance with a preferred embodiment, energy unit 10 collects sunlight using power source 60 and converts the sunlight to electricity. That electricity is used to convert water to hydrogen during electrolysis. This hydrogen is then stored in solid form for later use in making electricity using the fuel cell component 40.

The energy unit 10, however, is not completely efficient such that it may be necessary to add water or other materials, such as metal hydride material at times. During the production of electricity, for example, some water may not condense to be used for the production of hydrogen during electrolysis, and instead may escape. Accordingly, pure water may be added to unit 10 in order to restore the unit's efficiency and to increase electricity production and the longevity of unit 10. In addition, it may be necessary to repair or replace other components, as well. While the hydride material is not consumed, it may clump due to impurities, and thus, may need to be replaced. Thus, the interior of the energy unit is preferably accessible, at least by removal of the panels 11, for example.

In one embodiment, as noted above, receptacle portions 14 are provided within unit 10. Preferably, studs 12 are slightly larger in diameter than that of receptacle portions 14. When two units 10 are pressed together, the studs 12 are received by the receptacle portions 14, and the studs 12 are essentially pressed into and around the receptacle portions 14. The receptacle portions 14 are preferably fashioned with a resilient material, such that portions of receptacle 14 press against the studs 12. Thus, friction prevents two hydrogen fuel energy units 100 from coming apart. Alternatively, or in addition, other fastening devices such as the fasteners 15 illustrated is FIG. 1 may be used to link units together.

In a preferred embodiment, some of the studs 12 and receptacles 14 are formed of a conductive material and operate as electric contact points, either between energy units 10 or to exterior electric loads. In a preferred embodiment, the polarity of the studs 12 and receptacles 14 may be altered as desired to allow a plurality of units to be connected in series, thereby increasing the overall voltage output. Alternatively, a plurality of units 10 can be connected in parallel, thereby increasing the overall amperage. The studs may also be provided to for transport of water or hydrogen between units 10. In addition, so-called dummy studs may be provided, which do not provide for communication between units but merely provide structural support in the connection between units.

A polarity alteration member is preferably included in stud 12. Preferably, stud 12 is provided such that a user can alter polarity by simply pressing and turning stud 12 in a respective position. For example, turning stud 12 in clockwise rotation selects a negative polarity, while turning stud 12 in a counter-clockwise rotation selects a positive polarity. Alternative embodiments are envisioned herein. For example, stud 12 is provided with a first end and a second end, and stud 12 may be removable. In this alternative embodiment, a respective polarity may be selected by the user inserting a respective end (i.e., first end or second end) into receptacle portion 14. In yet another alternative embodiment, a switching member may be provided with stud 12 and/or receptacle 14 that enables a user to select a respective polarity.

Enabling a user to switch polarity is a significant feature of the teachings herein as it enables a user to operate a plurality of hydrogen fuel energy units 100 in series or in parallel. Thus, such as batteries (e.g., AAA batteries, AA batteries or the like) in a respective battery compartment, units 100 can operate in series or in parallel.

In one embodiment, the studs 12 may also be used for transport of water between linked energy units 10, as noted above. In one embodiment, one of the studs 12 is used as a pass through to allow water to pass from one energy unit to another. Two other studs 12 may be used in order to adjust water pressure in the grouping of units. Similarly, for those rods that are electrically conductive, one stud 12 may be used as a pass through for electricity between energy units while two other studs 12 may include the polarity adjustment features discussed above to allow for linking the units 10 in series and parallel. While, the above embodiment is described with reference to a total of 6 rods, more or fewer rods may be used. For example, FIGS. 1-3 illustrates eight studs 12. The corresponding receptacles 14 are preferably modified as appropriate to work as described above with the studs 12.

It is envisioned herein that a plurality of energy units 10 operates over time to produce significant amounts of electricity. In general, it is believed that there is an optimal 2.5:1 to 3:1 ratio of time required for producing hydrogen (e.g., during electrolysis) to the time in which electricity, as in line voltage, is provided. For example, four and one half hours of collecting sunlight and producing hydrogen results in, generally, one hour of converting the hydrogen to electricity as an electrical supply. Of course, one skilled in the art will recognize that various environmental and/or external factors may affect this performance ratio. For example, in case sunlight is not available during a long stretch of overcast days, or in case unit 100 becomes dirty over time, the ratio may be much higher, such as 5:1, thereby temporarily decreasing the overall efficiency of unit 100. As improvements in known solar panel technology and fuel cell technology emerge, including with regard to the polymer membrane, the charging efficiency and electricity production of fuel cell unit 100 improve.

Thus, in a preferred embodiment, energy unit 10 is preferably grouped with two other similar units to operate together in order to provide a more or less constant supply of power. In this embodiment, one energy unit 10 will be in the first mode of generating hydrogen by electrolysis while a second unit is in the second mode storing hydrogen and the third unit is in the third mode and actively generating electricity from released stored hydrogen. The units will then cycle through the modes. It is preferred that the number of energy units 10 grouped together is a multiple of three, such that they can be operated in a staggered manner similar to that described above.

In one embodiment, the energy unit 10 is provided with processing capability, preferably, comprising one or more circuits, switches or processors, as known in the art that enables the control for successive operation of a plurality of units 10 described above. In another embodiment, or in addition, the energy unit 10 may include a simple switching mechanism that changes the mode of operation. In one embodiment, the switching mechanism is a pressure sensitive switch that senses when a predefined buildup of hydrogen has been collected, and switches unit 10 from providing hydrogen to storing hydrogen. Another switch or an additional switch allows transition to the electricity-providing mode from the hydrogen-storing mode. In an alternative embodiment, the switching mechanism recognizes when a water level has reached a predefined position, thereby indicating an amount of hydrogen has been produced, and switches unit 10 from providing hydrogen to storing hydrogen and then to providing electricity using the hydrogen. Therefore, unit 10 preferably alternates between hydrogen providing, storing and electricity generation mode, and operates accordingly as a function of the switch or switches. The switch mechanism may also be actuating by a processor, for example, if desired.

In an embodiment, a switch mechanism that causes unit 10 to operate in a hydrogen providing mode, hydrogen-storing mode or in an electricity providing mode is formatted as an air pressure switch. As hydrogen is being produced, for example, during electrolysis, pressure increases. The pressure increase causes the switch to activate, preferably after a predefined pressure is reached. Thereafter, as pressure reduces as a function the storing of the hydrogen in the metal hydride, or by use of hydrogen to provide electricity. Then the switch is again activated and energy unit 10 reverts to a mode for the production of hydrogen. Providing for pass through of water and electricity between multiple units links the units such that pressure sensing alone may be used to determine when switching between modes should occur. These changes may also be controlled by a processor, if desired.

It is believed that voltage and amperage is better controlled with hydrogen-based electricity than that provided, for example, from photovoltaic processes. By converting hydrogen to electricity, the teachings herein preclude the requirements for additional components, such as rectifiers and other equipment, known in the art as line conditioning, that may be required for purifying output line voltage. In other words, the voltage condition is improved as a function of the converted hydrogen electricity. In addition, the output of the electricity from the unit 10 may be conditioned or converted, preferably using a removable inverter unit.

It is envisioned herein that the solutions provided herein are particularly useful for hydrogen-powered requirements that have humanitarian, educational, and commercial value. The energy units 10 represent a portable and extremely durable energy source that function independently and that also can be stacked and interconnected to create a larger energy source. One example use of the electricity that is produced by the teachings herein includes running a well in a remote location with little supervision. Further, as noted above, the oxygen generated by the unit 10 may be used to aid in water purification, for example. Thus, a high technical and sophisticated solution that is relatively simple to implement can be provided for in low technical scenarios. One of the benefits of the energy unit 10 of the present application is portability. A large generator may need to be disassembled and transported in multiple pieces in order to be moved. This introduces the possibility of losing key pieces. In contrast, when energy units 10 are used, any combination of units may be bundled to provide the desired power. No single unit is critical to the operation of the whole.

In another example application and embodiment, an outdoor concert venue is provided that is powered by a plurality of energy units 10. In this example embodiment, the components of the system, including solar driven electrolysis, hydrogen storage, and fuel cells including transparent panels 11 allows for the power source to become part of the entertainment and art and draws a new level of attention to the possibilities. The energy units 10 power many (if not all) elements of the venue, including, for example, the stage, lights, concessions, and even transportation units, such as golf carts. A benefit of the teachings herein is that the electricity is produced in a clean manner, and because the energy units 10 include clear panel 11, educational benefits are provided, as well. By bringing energy units 10 to a site one or more days in advance, solar energy may be used in advance to provide hydrogen that can be stored safely until used to produce all the hydrogen necessary to supply electricity for the event. The venue may be stationary or mobile, depending upon its size and respective application. Other applications are envisioned herein, and can range from an individual podium to a large-scaled concert stage.

Further, the PEM fuel cells produce oxygen and water, which provide bubbles that contribute to the overall aesthetics. Other aesthetically pleasing features are envisioned, including lighting energy units 10 using colored light, lasers or the like. In this way, various aesthetics are provided in addition to environmentally friendly and resource conservation features.

The electricity production mode of unit 10 is exothermic, whereby heat dissipates from the plate and the water via the membrane, which acts as a vent. Hence, fuel cell unit 10 ventilates heat, which can be directed through one or more membranes. The unit 10 produces heat while storing hydrogen and cools off, down to 60 F or so, when generating electricity. Further, fuel cells are provided as energy sources and as window material. In an embodiment, units 10 are constructable to release heat generated during the electricity production phase in a predetermined direction. Thus, a window comprising one or more fuel cell units 10 enable a flow of heat inwardly, thereby heating a structure, such as a house, and providing other emergency and humanitarian solutions.

Further, the storage unit may be used without the electrolysis unit, for example, for the production of electricity without noise or heat.

Although the teachings herein are described and shown in relation to particular embodiments thereof, many other variations and modifications and other uses will become apparent to those skilled in the art. It is preferred, therefore, that the present invention be limited not by the specific disclosure herein.

What is claimed is:

1. An energy unit comprises:
   a housing;
   a power source mounted in or on the housing and configured to provide electricity;
   a fluid chamber in the housing configured to hold a volume of fluid;
   an electrolysis element in the housing electrically connected to the power source and in fluid communication with the fluid chamber, the electrolysis chamber configured and operable to break the fluid down and to provide hydrogen gas;
   a hydrogen storage element in the housing connected to the electrolysis element and configured to store hydrogen in solid form,
   the hydrogen storage element includes:
      a symmetrically shaped housing;
      a solenoid mounted on a first end of the symmetrically shaped housing and reciprocating at a desired frequency;
      a ram head attached to a free end of the solenoid in the symmetrically shaped housing such that the ram head reciprocates with the solenoid; and
      a metal hydride material positioned around the sides of the symmetrically shaped housing, wherein the reciprocating motion of the solenoid and ram head drives hydrogen into the metal hydride material; and
   a fuel cell in the housing, connected to the hydrogen storage element and operable to generate electricity using at least hydrogen supplied from the hydrogen storage element.

2. The energy unit of claim 1, wherein the power source is a solar power source configured and operable to provide electricity based on sunlight.

3. The energy unit of claim 1, wherein the fluid chamber holds water and the electrolysis element is configured to separate the water into hydrogen gas and oxygen gas utilizing electricity from the power source.

4. The energy unit of claim 3, wherein the oxygen gas is directed out of the housing.

5. The energy unit of claim 1, wherein the fluid chamber includes a bio fuel and the electrolysis element is configured to separate hydrogen gas from the bio fuel utilizing electricity from the power source.

6. The energy unit of claim 1, wherein the cylindrical symmetrically shaped housing further comprises an inlet connected to the electrolysis element and an outlet connected to the fuel cell.

7. The energy unit of claim 6, further comprising:
   an inlet valve positioned in the inlet and selectively openable to allow hydrogen gas from the electrolysis unit into the symmetrically shaped housing; and
   an outlet valve positioned at the outlet and selectively openable to allow hydrogen in the symmetrically shaped housing to exit into the fuel cell.

8. The energy unit of claim 1, further comprising:
   at least one protrusion extending from the housing; and at least one recess, formed in the housing, opposite the protrusion.

9. The energy unit of claim 8, wherein the at least one protrusion is electrically connected to at least one of the fuel cell and the power source and is configured to supply or receive electricity to or from an external device.

10. The energy unit of claim 9, wherein the protrusion is in fluid communication with the fluid chamber and is configured to provide or receive fluid to or from the external device.

11. The energy unit of claim 10, wherein the external device is an energy unit in accordance with claim 1.

12. The energy unit of claim 8, wherein the at least one recess is electrically connected to at least one of the fuel cell and the power source and is configured to supply or receive electricity to or from an external device.

13. The energy unit of claim 12, wherein the recess is in fluid communication with the fluid chamber and is configured to provide or receive fluid to or from an external source.

14. The energy unit of claim 13, wherein the external device is an energy unit in accordance with claim 1.

15. An energy system comprising:
a plurality of energy units;
each energy unit comprising:
a housing;
a power source mounted in or on the housing and configured to provide electricity;
a fluid chamber in the housing configured to hold a volume of fluid;
an electrolysis element in the housing electrically connected to the power source and in fluid communication with the fluid chamber, the electrolysis chamber configured and operable to break the fluid down and to provide hydrogen gas;
a hydrogen storage element in the housing connected to the electrolysis element and configured to store hydrogen in solid form,
the hydrogen storage element includes:
a symmetrically shaped housing;
a solenoid mounted on a first end of the symmetrically shaped housing and reciprocating at a desired frequency;
a ram head attached to a free end of the solenoid in the symmetrically shaped housing such that the ram head reciprocates with the solenoid; and
a metal hydride material positioned around the sides of the symmetrically shaped housing, wherein the reciprocating motion of the solenoid and ram head drives hydrogen into the metal hydride material; and
a fuel cell in the housing, connected to the hydrogen storage element and operable to generate electricity using at least hydrogen supplied from the hydrogen storage element;
wherein each energy unit is connected with at least one other energy unit such that multiple energy units operate together to provide electricity at a desired voltage or current.

16. The energy system of claim 15, wherein each energy unit of the plurality of energy units further comprises:
at least one protrusion extending from the housing; and
at least one recess, formed in the housing, opposite the protrusion.

17. The energy system of claim 16, wherein the at least one protrusion is electrically connected to at least one other energy unit of the plurality of fuel cells to supply or receive electricity.

18. The energy system of claim 16, wherein the protrusion is in fluid communication with the fluid chamber and is configured to provide or receive fluid to or from from at least one other energy unit.

19. The energy system of claim 15, wherein the at least one recess is electrically connected to at least one of the fuel cell and the power source and is configured to supply or receive electricity to or from at least one other energy unit.

20. The energy system of claim 19, wherein the at least one recess is in fluid communication with the fluid chamber and is configured to provide or receive fluid to or from at least one other energy unit.

21. An energy unit comprises:
a housing;
a power source mounted in or on the housing and configured to provide electricity;
a fluid chamber in the housing configured to hold a volume of fluid;
an electrolysis element in the housing electrically connected to the power source and in fluid communication with the fluid chamber, the electrolysis chamber configured and operable to break the fluid down and to provide hydrogen gas;
a hydrogen storage element in the housing connected to the electrolysis element and configured to store hydrogen in solid form
the hydrogen storage chamber includes:
a symmetrically shaped housing;
a vibrating element mounted on a first end of the symmetrically shaped housing and reciprocating at a desired frequency; and
a metal hydride material positioned around the sides of the symmetrically shaped housing, wherein the reciprocating motion of the vibrating element drives hydrogen into the metal hydride material; and
a fuel cell in the housing, connected to the hydrogen storage element and operable to generate electricity using at least hydrogen supplied from the hydrogen storage element.

* * * * *